United States Patent [19]

Wada et al.

[11] Patent Number: 4,672,489
[45] Date of Patent: Jun. 9, 1987

[54] HEAD ROTATION APPARATUS FOR VIDEO TAPE RECORDER

[75] Inventors: Shigekazu Wada; Kenji Okuda, both of Tokorozawa, Japan

[73] Assignee: Pioneer Electronic Corporation, Tokyo, Japan

[21] Appl. No.: 912,681

[22] Filed: Sep. 26, 1986

Related U.S. Application Data

[63] Continuation of Ser. No. 621,207, Jun. 15, 1984, abandoned.

[30] Foreign Application Priority Data

Jun. 17, 1983 [JP] Japan .......................... 58-093576[U]

[51] Int. Cl.⁴ .................. G11B 5/48; G11B 21/16; G11B 5/56; G11B 21/04
[52] U.S. Cl. .................................. 360/104; 360/107; 360/109
[58] Field of Search ................ 360/75, 77, 84, 85, 360/107, 108, 109, 104

[56] References Cited

U.S. PATENT DOCUMENTS

| | | | |
|---|---|---|---|
| 4,099,211 | 7/1978 | Hathaway | 360/107 |
| 4,295,172 | 9/1981 | Fukuda et al. | 360/77 |
| 4,306,261 | 12/1981 | Bergmans et al. | 360/84 |
| 4,395,741 | 7/1983 | Kobayashi et al. | 360/77 |
| 4,412,259 | 10/1983 | Hiraguri | 360/84 |
| 4,507,696 | 3/1985 | Hütter | 360/84 |

FOREIGN PATENT DOCUMENTS

55-67938  5/1980  Japan ......................... 360/107

Primary Examiner—Robert S. Tupper
Assistant Examiner—Melissa J. Koval
Attorney, Agent, or Firm—Fleit, Jacobson, Cohn & Price

[57] ABSTRACT

A head rotation apparatus for mounting and rotating the record/reproduce heads of a video tape recorder includes a head drum having a planar main face formed thereon in a plane perpendicular to the axis of rotation of the heads, one or more fixed heads fixedly attached to the head drum with a planar lower surface of each head abutting directly against the head drum main face, and a voltage-sensitive deflection member having a planar main face with at least one movable head fixedly mounted on a tip portion of the latter main face, with an attachment portion of the deflection member main face being held abutting directly against the planar surface of each fixed head. The fixed and movable heads are thereby accurately aligned with respect to the direction of the axis of rotation of the heads, with a very simple mechanical configuration.

4 Claims, 13 Drawing Figures

PRIOR ART

HEAD ROTATION APPARATUS FOR VIDEO TAPE RECORDER

This application is a continuation of application Ser. No. 621,207, filed June 15, 1984, now abandoned.

BACKGROUND OF THE INVENTION

The present invention is directed towards a head rotation apparatus for a video tape recorder, i.e. the component assembly within a video recorder which mounts and rotates the record/reproduce heads with respect to the video tape. Such an apparatus is disposed within a cylindrical fixed drum (generally referred to as the guide drum) having a peripheral slit formed therein, within which the tips of the heads rotate against the video tape, which is guided to move diagonally around the guide drum. In this way, successive diagonally oriented tracks are recorded on the video tape as the heads rotate and the tape moves over the guide drum, with the rotation of the heads serving to increase the relative speed between the heads and the video tape, to maximize the recording frequency response. In particular, the invention is directed towards a head rotation apparatus which is provided with both fixed heads and movable heads, i.e. heads which can be controllably displaced along the axis of rotation of the heads by means of drive voltages. Such movable heads are necessary to produce certain special effects with a video tape recorder, such as slow-motion or stationary reproduction of recorded material. When such special modes of reproduction are carried out, the relative velocity between the heads and the video tape will in general be different from that at the time of recording, and as a result the direction of the path traced out of each head over the video tape will differ from that of the recorded tracks, i.e. will form a certain angle with respect to the recorded tracks. For this reason, it is necessary to compensate the head movement such that the heads being used for reproduction will accurately follow the previously recorded tracks on the video tape. This can be accomplished by moving the heads in the direction of the axis of rotation of the heads, at a suitable rate, such as to move along the paths of the originally recorded tracks while reporduction is in progress. A method of executing such movement of the heads which is well-known in the art is to mount one or more heads on members having electrodes disposed thereon, the members being formed of a material which exhibits deflection in response to voltages applied to the electrodes, with the magnitude of the deflection being determined by the amplitude of the applied voltage. Suitable materials for this purpose include bimorph ceramics. Such movable heads, and means for controlling the head movement, are disclosed in Japanese patent laid-open 52-117106 and publication 56-50329.

It is an essential condition for a recording head assembly incorporating such movable heads, generally mounted in conjunction with fixed heads, that the "home position" of each movable head (i.e. the position of the head in the absence of voltage applied to the corresponding deflection member) is accurately defined with respect to the fixed heads and the axis of rotation. In general, two diametrically opposed fixed heads are utilized, mounted on a head drum which is driven by a motor, with two movable heads being mounted diametrically opposed on a ring-shaped deflection member. This deflection member is held clamped with respect to the head drum at positions 90° apart from the movable heads, i.e. the movable heads are disposed 90° apart from the fixed heads. Electrodes are formed on the respective halves of the deflection member, divided in this manner, so that the two movable heads can be independently moved along the direction of the axis of rotation by control voltages applied to the respective halves of the deflection member. In the prior art, however, the mechanical configuration adopted for the means whereby the movable heads (i.e. in the "home position") are aligned accurately with respect to the fixed heads and the axis of rotation are relatively complex, and require that a plurality of surfaces which are disposed in different planes be machined to an extremely high degree of precision. Thus, such an assembly is expensive to manufacture, and is difficult to make light in weight and compact, as will be made clear from a description of an example of such a prior art type of head rotation appratus.

It is therefore an objective of the present invention to provide an improved head rotation apparatus, whereby the disadvantages of the prior art described above may be overcome, by ensuring that the requisite degree of accuracy of positioning the movable heads can be attained with a simpler and more easily manufactured configuration.

SUMMARY OF THE INVENTION

A head rotation apparatus according to the present invention essentially comprises a member which is of basically cylindrical configuration and will be referred to as the head drum (this being coupled directly or indirectly to an electric motor to be rotated thereby) having an upper planar surface formed thereon in a plane disposed perpendicular to the axis of rotation, one or more fixed heads each having a lower planar surface and each being fixedly attached to the head drum with a portion of the latter planar surface directly abutting against the main face of the head drum and a remaining portion of the latter planar surface extending radially inward from the inner periphery of the main face of the head drum. A voltage-sensitive deflection member having electrodes formed thereon and an upper planar surface formed thereon is mounted with at least one attachment portion thereof fixedly held against the inwardly protruding portion of the lower planar surface of a fixed head. At least one movable head is fixedly attached to a tip portion of the deflection member, spaced apart from the attachment portion of the deflection member, on the upper planar surface of the deflection member. In this way, the upper planar surface of the deflection member is fixed precisely co-planar with the main face of the head drum, so that the positions of the movable heads with respect to direction of the axis of rotation and the fixed heads are accurately established.

The deflection member may be held against the fixed heads by means of clamping members attached to the head drum, or by other means such as adhesive material.

Such a configuration can be made extremely simple, as will be apparent from the embodiment discussed hereinafter, and so can be manufactured at low cost and can be made compact and lightweight.

A control system is also described, whereby deviations in the rotational paths of movable heads mounted on an apparatus according to the present invention resulting from mechanical inaccuracies can be eliminated, as also can tracking errors resulting from inaccuracies in the shape of video tape guide surfaces provided on the exterior of the completed head drum assembly.

DESCRIPTION OF THE PREFERRED EMBODIMENTS

Figure 1:
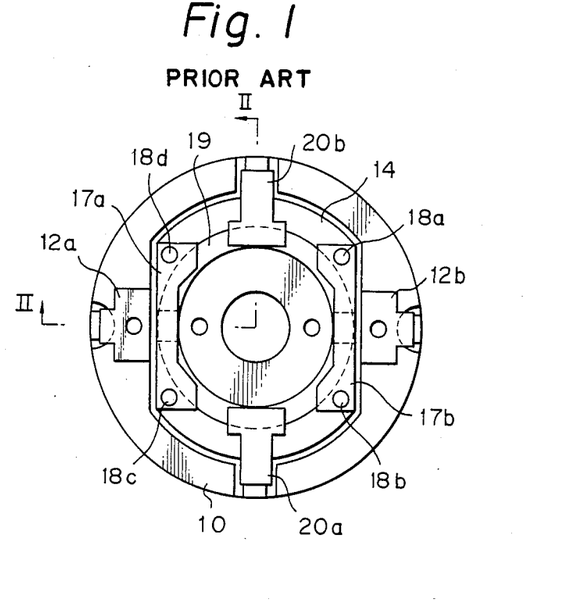
FIGS. 1, 2 and 3 are a plan view, a crosssectional view in elevation taken along the line II—II of FIG. 1, and an expanded view, respectively, of an example of a prior art head rotation apparatus.
Figure 2:
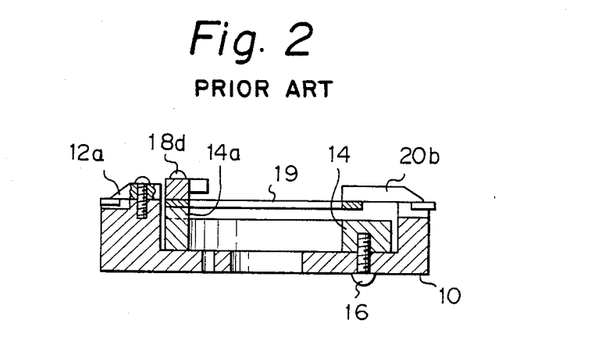
Figure 3:
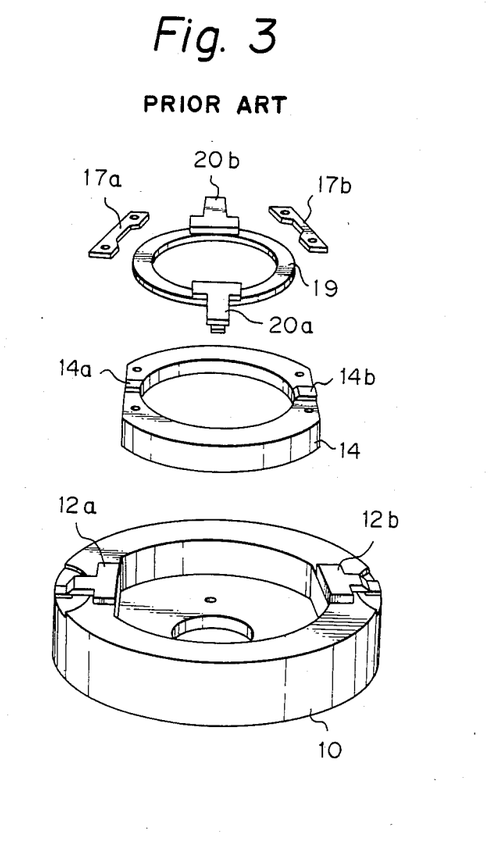

Before describing an embodiment of the present invention, an example of a prior art type of head rotation apparatus for a video type recorder will be discussed, referring to FIGS. 1, 2 and 3, which are, respectively, a plan view, a cross-sectional view in elevation, and an expanded oblique view of the apparatus. Numeral 10 denotes a head drum, which is of basically cylindrical form and on which the other components of the apparatus are mounted. Head drum 10 is designed to be coupled directly or indirectly to an electric motor by means which are omitted from the drawings, to be thereby rotated at constant speed, and it rotates within an outer casing (not shown in the drawings) referred to as the guide drum, over which passes a video tape. Fixed heads denoted as 12a, 12b are mounted diametrically opposite, each other upon an upper planar peripheral surface of head drum 10. A convex region is formed within head drum 10, within which a supporting member 14 which is of basically annular shape is mounted, fixedly attached to head drum 10 by screws 16. 14a, 14b denote two protrusions formed on the upper face of supporting member 14, disposed at angular positions corresponding to those of fixed heads 12, 12b, respectively. Numeral 19 denotes a deflection member, which is of annular shape and is formed of a material which exhibits the property of bending in response to an applied voltage, e.g. bimorph ceramic. Movable heads 20a, 20b are mounted diametrically opposite one another on a planar upper face of deflection member 19. 17a, 17b denote a pair of attachment members which are disposed diametrically opposite one another, as shown in FIG. 1, with deflection member 19 being held clamped between attachment members 17a, 17b and protrusions 14a, 14b on supporting member 14, respectively, by means of screws 18a to 18d which engage in threaded holes in supporting member 14 and bear upon attachment members 17a, 17b.

In this way, deflection member 19 is divided into two halves by the clamping action of attachment members 17a, 17b and protrusions 14a, 14b, with the movable heads 20a, 20b being respectively mounted at the outer tip portion of each half of deflection member 19. Electrodes (not shown in the drawings) are formed on each of these halves of deflection member 19, to which voltages are applied from external circuit means when it is required to induce movement of the movable heads 20a, 20b. The movable heads 20a, 20b are thereby caused to move along the direction of the axis of rotation of the apparatus, i.e. such as to follow the paths of previously recorded tracks on the video tape, when the movable heads are being used for reproduction of video signals during a non-standard operating mode of the video tape recorder.

With such a configuration, if each of fixed heads 12a, 12b and movable heads 20a, 20b is formed with an accurately planar lower face abutting against the upper faces of head drum 10 and deflection member 19, respectively, and if the upper face of the convex recessed portion of head drum 10 in which supporting member 14 is mounted is machined to be accurately planar, and moreover if the upper faces of head drum 10 and of deflection member 19 are machined to be accurately planar, and both supporting member 14 and deflection member 19 are machined to accurately predetermined thicknesses, as measured axially, then the fixed heads 12a, 12b and the movable heads 20a, 20b will be accurately positioned with respect to one another and with respect to the axis of rotation of the apparatus. However if any of these conditions is not met, or if any positioning errors should result at the stage of assembly of the apparatus, then it will not be possible to attain accurate positioning of the heads, and proper operation of the apparatus will not be obtainable. It can thus be appreciated that with such a prior art type of head rotation apparatus it is necessary to perform machining of the components of the apparatus to a very high degree of accuracy, thereby making the manufacturing cost substantial. In addition, due to the number of components which must be correctly attached in accurate relationships to one another, the manufacturing process is complex, and positional deviations can easily occur. Furthermore, due to the various components constituting such an apparatus, it is diifficult to make the overall head drum assembly compact and light in weight.

Figure 4:
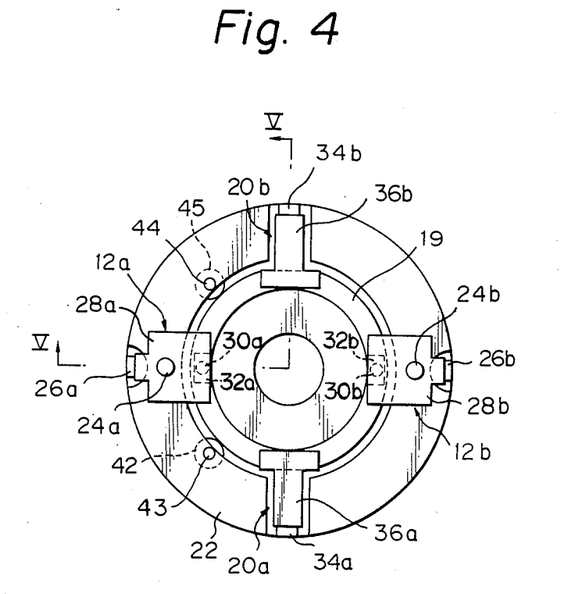
FIGS. 4, 5, and 6 are a plan view, a crosssectional view in elevation taken along the line V—V of FIG. 4, and an expanded view, respectively, of an embodiment of a head rotation apparatus according to the present invention.
Figure 5:
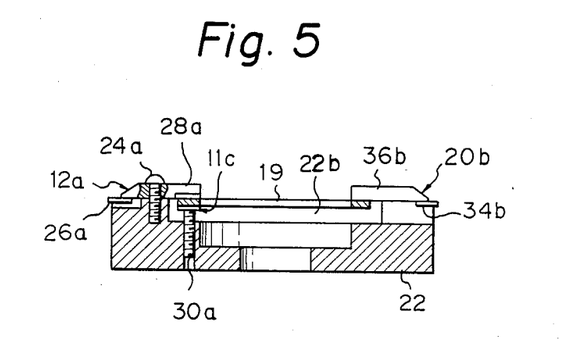
Figure 6:
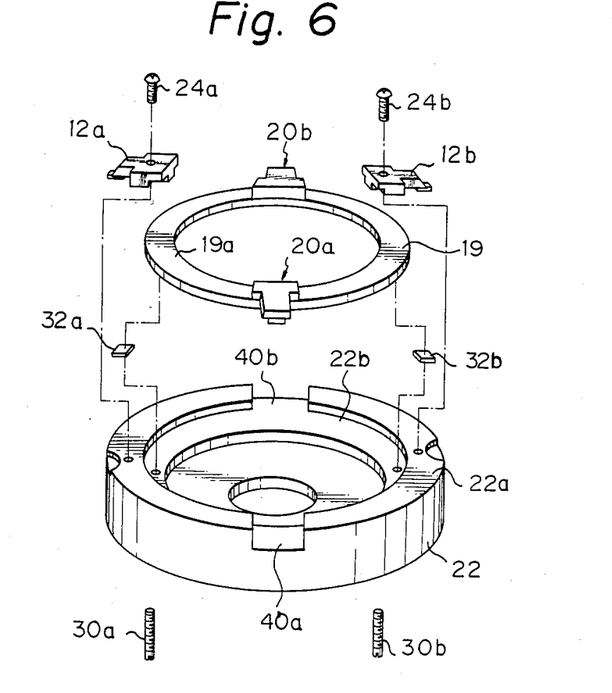

FIGS. 4, 5 and 6 show a plan view, a cross-sectional view in elevation, and an expanded oblique view, respectively, of an embodiment of a head rotation apparatus according to the present invention. As is apparent from the view of FIG. 6, this apparatus does not require the use of the annular supporting member 14 of the prior art example described above. Components which can be identical to corresponding components in that prior art example are indicated by identical reference numerals. The head drum 22 of this embodiment has a peripheral upper face 22a which is machined to be accurately planar, in a plane directed perpendicular to the axis of rotation of the head rotation apparatus, and will be referred to in the following as the main face of the head drum. The deflection member 19, which has a planar upper face 19a formed thereon, referred to in the following as the main face of the deflection member, has movable heads 20a, 20b mounted on main face 19a, at angular positions which are 180° apart. Two pressure plates 32a, 32b, which bear against the lower face of deflection member 19 as shown, apply pressure to that lower face due to forces applied by screws 30a, 30b, respectively, bearing upon the lower faces of pressure plates 32a, 32b. Screws 30a, 32b engage in corresponding threaded holes formed in head drum 22. A pair of fixed heads 12a, 12b are fixedly mounted on the main face 22a of head drum 22, by attachment screws 24a, 24b, respectively, which engage in corresponding threaded holes in head drum 22, these fixed heads 12a, 12b being mounted at angular positions spaced 180° from one another and spaced 90° apart from the movable heads 20a, 20b. Recessed portions 40a, 40b are formed extending downwards below main face 22a of head drum 22 at positions corresponding to movable heads 20a, 20b, to permit movement of movable heads 20a, 20b in the direction of the axis of rotation of the apparatus.

It can be understood that the pressure plates 32a, 32b, in conjunction with screws 30a, 30b, respectively act to clamp deflection member 19 between pressure plates 32a, 32b and the lower faces of fixed heads 12a, 12b respectively, with clamping forces being applied to two portions of the deflection member 19 spaced 180° apart, i.e. corresponding in angular positions to the fixed heads 12a, 12b, which will be referred to in the following as the attachment positions of deflection member 19. As in the prior art example described above, electrodes (not shown in the drawings) are connected respectively to the two halves of deflection member 19, which are thereby defined by these attachment portions thereof, these electrodes being coupled to external circuits which apply control voltages to produce deflections of the outer tips of each of these halves of deflection member 19, i.e. movement in a direction parallel to the axis of rotation of the apparatus by movable heads 20a, 20b which are respectively attached at these tip portions of the two halves of deflection member 19 thus defined.

Figure 7:
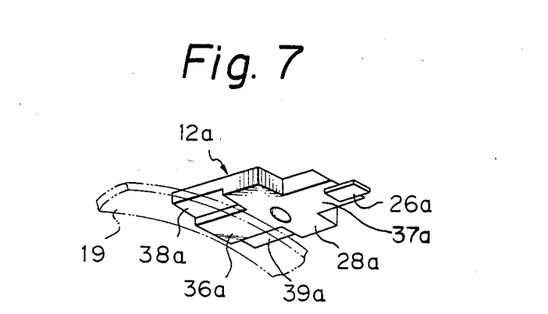
FIG. 7 is a detailed oblique view to illustrate the positional relationships between the lower face of a fixed head and a main face of a deflection member in the embodiment of FIGS. 4 to 6.

FIG. 7 is an oblique view showing the shape of the lower face of each of fixed heads 12a, 12b, illustrating the positioning relationship with deflection member 19, with fixed head 12a being shown for illustration. As shown, the head comprises a head chip 26a, and a head base member 28a on which the head chip is mounted. Base member 28a has a lower face which is machined accurately planar, and a portion of this lower face, designated as 36a, bears directly against the main face of deflection member 19, while a remaining portion of that lower face disposed radially outward from portion 36a and designated as 37a, bears directly against the main face of head drum 22. As described previously the main face of deflection member 19 is clamped in position against the lower face of each of the fixed heads 12a, 12b by the corresponding pressure plates 32a, 32b.

It will be clear that with such a configuration, it is only necessary to ensure that the main face of deflection member 19 is accurately planar, that the lower faces of fixed heads 12a, 12b are also accurately planar, and that the main face of head drum 22 is accurately planar and disposed in a plane perpendicular to the axis of rotation of the apparatus. It these conditions are met, then assuming fixed heads 12a, 12b and movable heads 20a, 20b to be of identical size and shape, the head chips of all of the heads of the apparatus will rotate in an accurately defined and identical manner, i.e. since the positions of each head with respect to the others and with respect to the axis of rotation is accurately set. It will also be apparent that this condition will be attained irrespective of variations in the thickness of deflection member 19 and that it is not necessary to accurately machine the upper faces of the convex portion 22b of head drum 22 within which deflection member 19 is located. In these respects, the present invention differs significantly from the prior art type of construction described hereinabove, in which it is necessary to provide a special annular supporting member for the movable heads 20a, 20b and in which the accuracy of positioning the movable heads 20a, 20b with respect to the direction of the axis of rotation will be affected by manufacturing deviations in the thickness of that supporting member or in the thickness of the deflection member, and by deviations in the surface condition of the upper face of the convex portion of the head drum within which that supporting member is located. Thus, a considerably greater degree of machining accuracy and a more complex manufacturing process are necessitated by the prior art example, by comparison with the construction of a head rotation apparatus according to the present invention. With the present invention, the construction ensures that both the fixed heads 12a, 12b and the movable heads 20a, 20b are accurately located in identical positions, with respect to the direction of the axis of rotation (i.e. when movable heads 20a, 20b are in the "home", or undeflected positions), due to the fact that the main face of deflection member 19 abuts against the lower faces of fixed heads 12a, 12b, which in turn abut directly against the main face of the head drum 22.

It will be clear from the above that due to the greater simplicity of construction and reduced number of components, a head rotation apparatus according to the present invention can be manufactured at lower cost and can be made more compact and light in weight than has been possible with prior art types of construction.

Although the above embodiment has been described for the case of two fixed and two movable heads, it is equally possible to apply the present invention to a head rotation apparatus having a different number of heads.

It should also be noted that the essential concept of the present invention does not lie in the specific manner in which the deflection member is held against the lower faces of the fixed heads 12a, 12b in the embodiment described above, i.e. by screws acting on pressure plates. It is equally possible to employ other means for ensuring that an attachment portion of the main face of the deflection member is held securely against the lower face of each of the fixed heads, such means including for example bonding of the attachment portions of the deflection member main face to the fixed head lower faces by means of an adhesive agent, permanently or semi-permanently.

Figure 8:
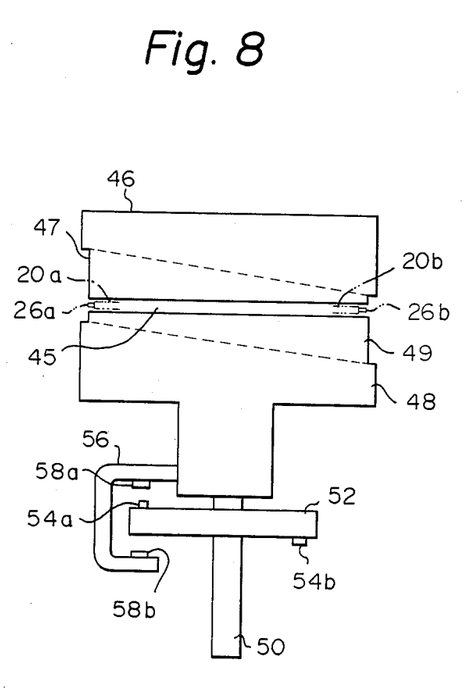
FIG. 8 is an external view in elevation of an embodiment of a head drum assembly incorporating a head rotation apparatus according to the present invention.

An example of a complete recording head drum assembly for a video tape recorder, employing a head rotation apparatus according to the present invention, is shown in external elevation in FIG. 8. This comprises an upper fixed drum 46 and lower fixed drum 48, each of hollow, basically cylindrical form, which are held stationary and are disposed coaxially with respect to the axis of rotation of the heads and contain the head rotation apparatus. These fixed drums 46 and 48 serve to guide the video tape along a predetermined path with respect to the rotating heads, this path being of spiral form, coaxial with the axis of rotation of the heads. A gap 45 is formed between the upper fixed drum 46 and lower fixed drum 48, within which the movable heads 20a, 20b and fixed heads 12a, 12b move, with the tip of the head chip of each head protruding slightly radially outward through gap 45, to contact the video tape surface. A drive shaft 50 is coupled to a drive motor, directly or by means such as a drive belt, and is held rotatably mounted in bearings provided in lower fixed drum 48. The head rotation apparatus according to the present invention described hereinabove is fixedly attached coaxially to drive shaft 50 to be rotated thereby.

The video tape (omitted from FIG. 8, for clarity of description) passes over a lead face portion 49 of the peripheral surface of lower fixed drum 48 and a corresponding lead face portion 47 of upper fixed drum 46. These lead faces 47 and 49 are machined to a high degree of precision such as to be slightly tapered, in order to lead the video tape along a precisely predetermined path with respect to the paths of rotation of the heads.

Since such a head drum assembly is generally mounted vertically, as shown FIG. 8, the positions of each head as measured along the direction of the axis of rotation will be referred to in the following as the head height (i.e. the height with respect to some arbitrary point along the axis).

The direction of rotation of the heads is such that the heads move in opposition to the direction of movement of the video tape, to thereby increase the relative velocity between them. The video tape passes around the periphery of the fixed drums over an angular extent which is greater than 180°, and which should be as close as possible to 360° to enable maximum recording density. Due to the relative directions of motion of the heads and video tape, a succession of adjacent diagonal tracks are recorded on the tape, and subsequently reproduced by the heads, i.e. each recorded track is aligned at a fixed angle with respect to the longitudinal direction of the video tape.

Numeral 52 denotes a member which is fixedly mounted on drive shaft 50, and has two permanent magnets 54a, 54b mounted diametrically opposite one another on opposite sides thereof, as shown, set at angular positions corresponding to the positions at which movable heads 20a, 20b respectively start to scan across the video tape, for recording or reproduction. A member 56 is fixedly attached to lower fixed drum 48, extending radially therefrom, and has a pair of magnetoelectric transducers 58a, 58b, e.g. Hall effect elements, mounted thereon at positions respectively adjacent to the paths of rotation of permanent magnets 54a and 54b. In this way, a signal pulse (referred to in the following as a drum pulse) is generated by transducer element 58 each time movable head 20a reaches a predetermined angular position. Similarly, a drum pulse is generated by transducer element 54b each time movable head 20b reaches that predetermined angular position.

Figure 9:
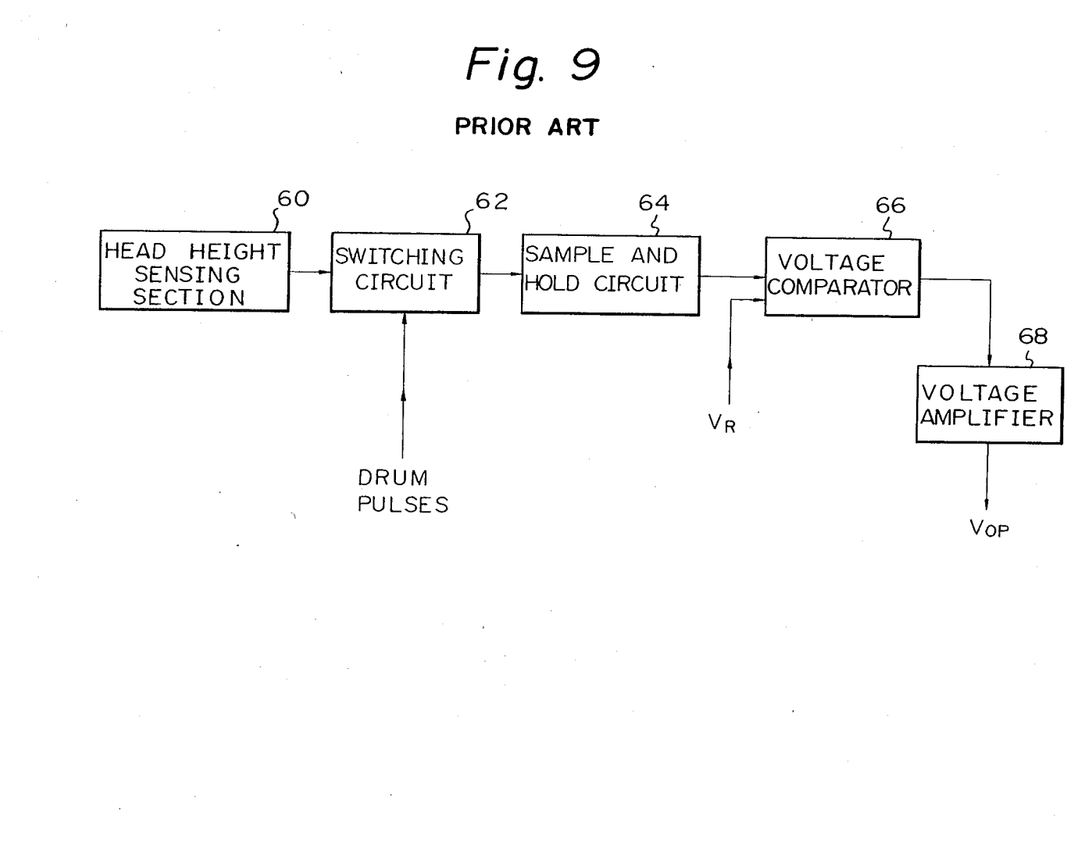
FIG. 9 is a block circuit diagram of a prior art type of control system for controlling the height of a movable head in a head rotation apparatus.

FIG. 9 is a simplified block circuit diagram of a prior art system for controlling the height of a movable head, such as either of movable heads 20a, 20b in a head rotation apparatus according to the present invention, i.e. by producing an output signal voltage $V_{op}$ which is applied to the electrodes formed on the portion of deflection member 19 on which movable head 20a (or 20b) is mounted, for controlling the height of the head. If the two movable heads 20a, 20b are controlled independently, then two circuits of the form shown in FIG. 9 would be necessary. In the following, for simplicity of description, the control of the height of head 20a will be described, however it will be understood that the means and method for controlling head 20b will be identical. In FIG. 9, a head height sensing section 60 comprises means for producing a head height signal indicating the height of movable head 20a with respect to a predetermined reference position, for example a voltage signal which reaches zero when head 20a is at the reference height and increases respectively positively and negatively as the head moves upward or downward with respect to the reference position. Each time movable head 20a reaches the reference angular position described above, a drum pulse from transducer 58a enables a switching circuit 62 to transfer the head height signal to a sample-and-hold circuit 64, whereby a corresponding output voltage level is produced from sample-and-hold circuit 64 during the succeeding revolution of head 20a. The output voltage is applied to one input of a comparator circuit 66, while a reference signal voltage $V_r$ is applied to the other input of comparator circuit 66. An output signal thereby produced by comparator circuit 66, representing the difference between the head height signal voltage and the reference signal voltage, is amplified by amplifier 68, to thereby produce control voltage $V_{op}$ to be applied to the electrodes of the deflection member portion which supports movable head 20a. The polarity of control voltage $V_{op}$ is selected such that the movable head will be moved along the axis of rotation in a direction tending to reduce the head height signal to zero, to thereby move the head to the reference height. It will also be clear that the head height can be adjusted by variation of the level of reference signal $V_r$.

Figure 10:
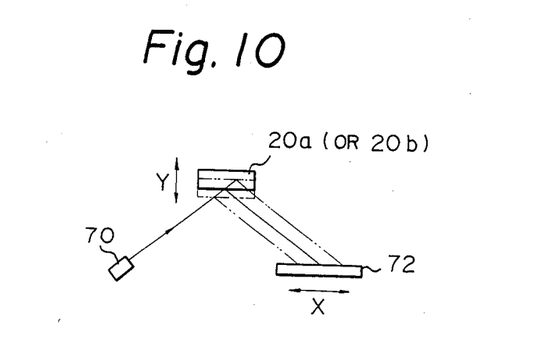
FIG. 10 is a simplified diagram illustrating a head height sensing system used in the system of FIG. 9.

FIG. 10 shows an example of an apparatus for performing the functions of head height sensing section 60. This comprises a fixedly mounted light source 70, producing a light beam which is directed to be obliquely incident on the lower face of each head, and to be reflected therefrom onto a photo-electric transducer section 72. The latter can comprise an array of photodiodes, for example, arranged in line along the X-direction indicated in FIG. 10. As the head height varies, i.e. in the Y direction, corresponding changes will occur in the positions at which the reflected light beam is incident on transducer section 72 in the X direction. In this way, head height signals of the form described above can be generated by transducer section 72. If these components are provided external to the fixed drums 46 and 48, it will be necessary to mount light source 70 and transducer section 72 such that light is reflected from each head at an angular position in the head rotation where the head is not covered by the video tape, i.e. between the positions at which the tape comes onto and leaves the drum surfaces. The sensing elements 58a, 58b must each be positioned at a substantially identical angular position to that at which light is reflected from the heads onto photo-electric tranducer section 72, for proper timing of the drum pulses.

Figure 11:
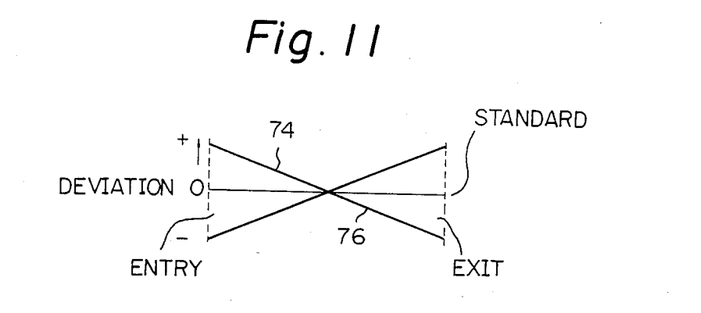
FIG. 11 and FIG. 12 are graphs for illustrating tracking errors and rotational path deviations of a video recording system, respectively.
Figure 12:
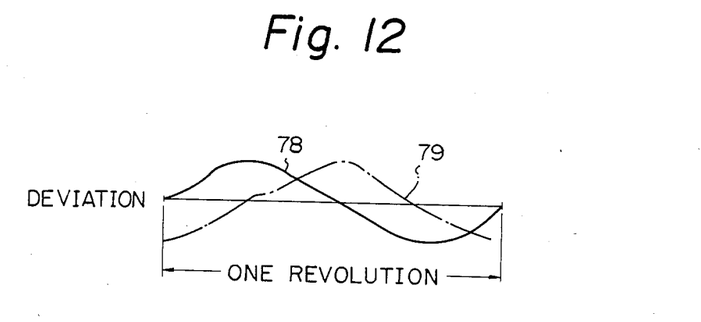

However, in order to ensure that a video tape recorded on one video tape recorder can be reproduced using any other video tape recorder of corresponding type, it is essential that the heads of each video tape recorder should move with respect to the recorded tracks along lines which are set at the same angle with respect to the longitudinal direction of the tape. Inaccuracies in machining of the lead faces of the fixed heads will result in deviations in the latter angle, these deviations being generally referred to as tracking errors. In addition, for compatibility of video tapes between different video tape recorders, it is necessary that the heads of each video tape recorder move along the video tape recorded tracks in a highly linear manner, i.e. that each head should rotate along a precisely predetermined path. But due to inaccuracies in the mechanical structure, e.g. in the alignment of the bearings which suppport the drive shaft and head rotation apparatus, deviations of the rotational path of each head will be produced, i.e. the heads will not scan linearly along the video tape. These deviations are illustrated in FIGS. 11 and 12. FIG. 11 shows the manner in which tracking error varies from the point at which the tape comes into contact with a lead face (designated as "entry" in FIG. 11) to the point at which the tape leaves the lead face (designated as "exit"). The line extending from zero corresponds to a tracking error of zero, which in practice the tracking error may be initially positive, then be inverted after reaching a value of zero (characteristic 74), or be of opposite form (characteristic 76), depending upon the form of machining inaccuracy of the lead faces. FIG. 12 illustrates the deviations which can occur in the rotational paths of the heads. The path of one head deviates from a linear condition in a sinusoidal manner, (curve 78) while a diametrically opposed head may deviate in a similar manner, differing in phase as shown (curve 79).

The degree of recording density attainable with a video tape recorder is in part determined by the spacing between adjacent recorded tracks on the tape, and such tracking errors and rotational path deviations make it difficult to reduce this spacing while maintaining, of video tapes, i.e. the capability to utilize tapes recorded on one video tape recorder on a different machine.

Figure 13:
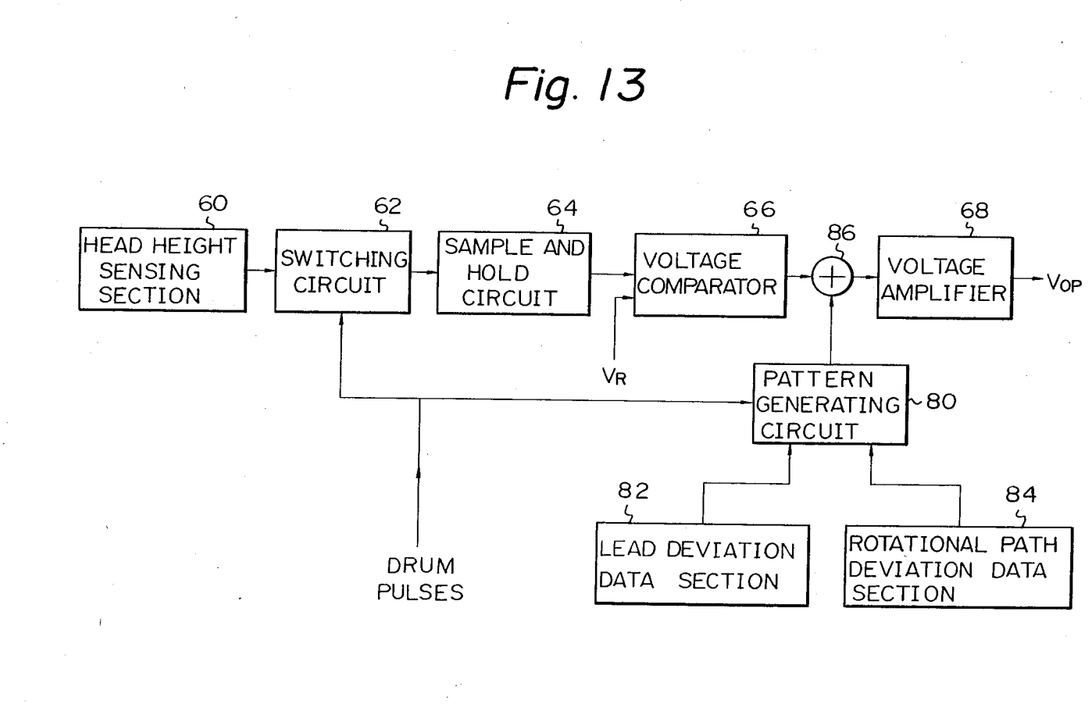
FIG. 13 is a block circuit diagram to illustrate a control system for controlling the height of a movable head of a head rotation assembly and compensating for tracking errors and rotational path deviations.

Utilizing the prior art control system of FIG. 9 above, if reference voltage Vr is held fixed, then the output control signal $V_{op}$ should ideally act to hold the height of the controlled head (e.g. 20a or 20b) at a corresponding fixed height as the head scans across the tape. However due to the rotational path deviations described above, this will not be ensured, and in general the head path will be non-linear. There is therefore a need for means for eliminating these rotational path deviations, and moreover for eliminating the tracking errors described above. FIG. 13 shows an embodiment of a control system for performing this error elimination function. In FIG. 13, circuit blocks having identical functions to those of the prior art example of FIG. 9 are indicated by corresponding reference numerals. Numeral 86 denotes a circuit for performing voltage summation, for applying to amplifier 68 a signal which is the sum of the output signals from comparator circuit 66 and from a pattern generating circuit 80. This pattern generating circuit 80 acts to generate an error correction signal which varies, as the controlled movable head (20a or 20b) continues to rotate after having attained the reference angular position indicated by a drum pulse, such as to vary the amplitude of output control voltage $V_{op}$ so as to produce movement of the controlled head which precisely compensates for the tracking errors and head rotational path deviations of the head drum assembly to which the control system is connected. This error correction signal is produced by pattern generating circuit 80 in accordance with data which is output from a lead deviation data section 82 and a rotational path deviation data section 84 respectively, representing the amounts of error to be successively corrected as the controlled head rotates. Thus, if for example reference signal $V_r$ is held at a fixed value, the controlled head will vary in height as it rotates across the video tape, by an amount which precisely compensates for the tracking error introduced by the head guide surface inaccuracies, with no height deviations occurring due to mechanical factors such as bearing misalignment etc.

Generally speaking, lead deviation data section 82 and rotational path deviation data section 84 can each comprise memory means in which the values of tracking error and rotational path deviation occurring at successive angular positions of the controlled head are stored, these values having been obtained following manufacture of the head drum assembly, by suitable measurement means. The pattern generating circuit 80 can then simply comprise means for commanding successive readout of this data at the appropriate timings, synchronized with the drum pulses, and digital-to-analog conversion means and other signal processing circuit means, for thereby producing the error correction signal from the stored error data. It will be apparent that such a pattern generating circuit 80, lead deviation data section 82 and rotational path deviation data section 84 can be readily implemented by commonly available integrated circuits, so that no detailed description will be given.

In this way, it can be ensured that tracking errors due to machining inaccuracies of guide surfaces of the head drum assembly, and rotational path deviations of the heads due to bearing misalignment etc, can be eliminated to a very high degree of accuracy, so that it becomes possible to reduce the spacing between adjacent tracks of a video tape and to thereby increase the maximum recording density, while maintaining compatibility of video tapes between different video tape recorders.

Although the present invention has been described above with reference to specific embodiments, it should be noted that various changes and modifications to the embodiments may be envisaged, which fall within the scope claimed for the invention as set out in the appended claims. The above specification should therefore be interpreted in a descriptive and not in a limiting sense.

What is claimed is:

1. A head rotation apparatus for a video tape recorder, comprising:
   (a) a head drum shaped for rotation about a central axis thereof and having an annular planar main face formed thereon coaxial with said central axis and perpendicular to said central axis;
   (b) at least one fixed head having a lower planar face formed on a lower side thereof, and attachment means for fixedly attaching said fixed head to said head drum, said fixed head being positioned with a first portion of said lower planar face thereof abutting directly against said annular planar main face of said head drum;
   (c) a voltage-sensitive deflection member having electrodes formed thereon and having a surface of one side thereof formed as a planar main face;
   (d) attachment means for fixedly retaining said deflection member with respect to said fixed head, said deflection member being positioned with an attachment portion of said planar main face thereof abutting directly against a second portion of said lower planar face of said fixed head, and;
   (e) at least one movable head fixedly mounted on said planar main face of said deflection member at a position displaced from the position of said fixed head by a specific angle, as measured about said central axis of said head drum.

2. A head rotation apparatus according to claim 1, in which said at least one fixed head comprises first and second fixed heads each formed with a lower planar face on a lower side thereof, said first and second fixed heads being respectively mounted on said annular planar main face of said head drum at positions separated by an angle substantially equal to 180° as measured about said central axis of said head drum, and in which said deflection member is of substantially annular shape and said main face of said deflection member is of substantially annular shape, with a first attachment portion of said annular planar main face of said deflection member abutting directly against said lower planar face of said first fixed head and a second attachment portion of said annular planar main face of said deflection member abutting directly against said planar face of said second fixed head, with separate ones of said electrodes being respectively formed on diametrically opposing portions of said deflection member, which are mutually separated by said attachment portions of said deflection member main face, and in which said movable head includes first and second movable heads which are mounted on said annular planar main face of said deflection member at positions respectively spaced apart from said positions of said first and second fixed heads by an angle substantially equal to 90°, as measured about said central axis of said head drum.

3. A head rotation apparatus according to claim 2, in which said attachment means for said deflection member include first and second clamping means mounted on said head drum to forcibly bear against said deflection member to fixedly clamp said deflection member between said first clamping means and said first fixed head and between said second clamping means and said second fixed head.

4. A head rotation apparatus according to claim 3, in which said first and second clamping means respectively comprise first and second screws each engaged in said head drum, and first and second pressure plates respectively bearing against an opposite side of said deflection member to said side of said deflection member having said annular planar main face formed thereon, at positions corresponding to said attachment positions of said annular planar main face of said deflection member, said pressure plates being forced against said deflection member by said first and second screws for clamping said deflection member between said first and second pressure plates and said first and second fixed heads respectively.

* * * * *